United States Patent [19]

Makita et al.

[11] 3,837,844

[45] Sept. 24, 1974

[54] WEAR RESISTING MAGNETIC MATERIAL HAVING HIGH PERMEABILITY

[75] Inventors: Mutsuo Makita, Kanagawa-ken; Wataru Hayakawa, Odawara; Masaaki Hayashi, Odawara; Yukio Kitagawa, Odawara, all of Japan

[73] Assignee: Hitachi, Ltd., Tokyo, Japan

[22] Filed: Aug. 6, 1971

[21] Appl. No.: 169,638

[30] Foreign Application Priority Data

Aug. 10, 1970 Japan .............................. 45-69222

[52] U.S. Cl. ................ 75/122, 75/123 J, 75/123 K, 75/123 M, 75/134 F, 75/170, 75/171, 148/31.55

[51] Int. Cl. ........................ C22c 19/00, C22c 39/40

[58] Field of Search ........... 75/170, 171, 122, 123 J, 75/123 K, 123 M, 134 F; 148/31.55, 31.57

[56] References Cited

UNITED STATES PATENTS

| | | | |
|---|---|---|---|
| 1,715,541 | 6/1929 | Elmen | 148/31.55 |
| 2,105,658 | 1/1938 | Honda | 148/31.57 |
| 2,990,277 | 6/1961 | Post et al. | 148/31.55 |
| 3,117,862 | 1/1964 | Clark | 148/31.55 |
| 3,269,834 | 8/1966 | Lykens et al. | 75/170 |
| 3,348,983 | 10/1967 | Odani et al. | 75/170 |
| 3,615,910 | 10/1971 | Tomita et al. | 148/31.55 |
| 3,673,116 | 6/1972 | Richter | 75/170 |

*Primary Examiner*—R. Dean
*Attorney, Agent, or Firm*—Craig & Antonelli

[57] ABSTRACT

A wear resisting magnetic material having high permeability in which not more than 10 percent by weight of at least one additive element selected from the group consisting of V and Ti is added to the conventional Fe-Ni series permalloy such as Fe-Ni, Fe-Ni-Mo, Fe-Ni-Cr and so on in order to enhance it's wear resisting property without impairing workability.

4 Claims, 1 Drawing Figure

PATENTED SEP 24 1974 3,837,844
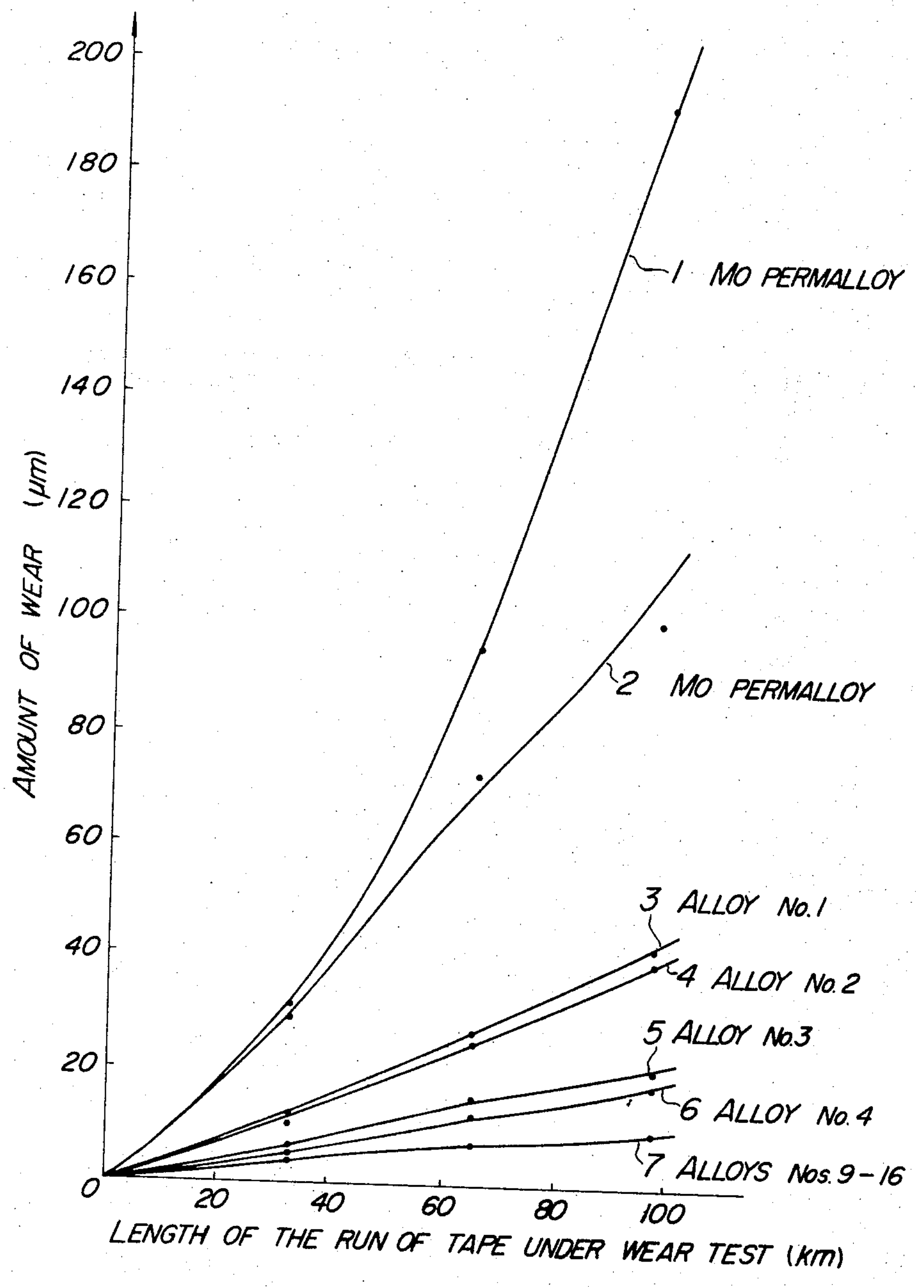
INVENTORS
MUTSUO MAKITA, WATARU HAYAKAWA, MASAAKI HAYASHI, YUKIO KITAGAWA
BY Craig, Antonelli & Hill
ATTORNEYS

WEAR RESISTING MAGNETIC MATERIAL HAVING HIGH PERMEABILITY

This invention relates to a magnetic material having excellent wear-resistance and high permeability. The magnetic material according to this invention exhibits remarkable effects particularly when used for magnetic heads for electronic computers, VTR's, etc.

In recent years, a magnetic recording technique has made a rapid progress and being widely used not only in the field of sound recording and image recording, but also in memory devices for electronic computers, etc. Magnetic materials used for magnetic heads of such electricity-magnetism converters in the art of magnetic recording are required not only to have such magnetic properties as high permeability and low coercive force, but also to have such mechanical property as wear-resistance particularly where they are used for magnetic heads of VTR's and electronic computers which are subjected to high speed friction.

As magnetic materials for magnetic heads, metallic magnetic materials such as permalloy (Fe-Ni alloy), sendust (Fe-Si-Al alloy), single crystals and sintered ferrite are mainly being used at the present time. Ferrite is satisfactory in respect of high frequency characteristic and wear-resistance, but is low in saturated flux density, mechanically fragile and hence poor in workability, and therefore, is not adapted for use as a magnetic material for magnetic heads.

Sendust alloys are being used for VTR heads, etc. as they are slightly superior to the other metallic magnetic materials in respect of wear-resistance, but a high permeability at high frequency level cannot be expected therefrom because they are fragile and cannot be worked into a thin sheet due to a great difficulty involved in the working procedure, such as forging or rolling, and hence is poor in productivity.

Permalloys are the most excellent magnetic materials amongst of all kinds of soft magnetic material and are highly workable and easy to use although they are slightly inferior to the others in respect of wear-resistance. Therefore, they are commonly being used as stable magnetic materials for magnetic heads.

The object of the present invention is to provide a magnetic material which satifies fully all the requirements for magnetic heads, by imparting wear-resistance property to permalloy which has high permeability and high workability as stated above.

The present invention will be described by way of example hereinafter with reference to the accompanying drawing.

The accompanying drawing is a graphic representation showing the wear-resistance characteristics of various magnetic materials, in which curves 1 and 2 represent the wear-resistance characteristics of conventional magnetic materials and curves 3 – 7 represent those of the alloys according to the present invention.

A number of wear resisting materials have been studied hitherto based on the conventional concept that harder materials are liable to be subjected to less wear and softer materials are subjected to more wear. However, the experiments conducted by the present inventors have revealed that wear is a phenomenon occuring between the surface layers of materials which are placed in friction engagement with each other and there exists no direct inter relation between the hardness and the wear of a material, that the fragility of a material is the factor which has a greater influence on the wear rather than the hardness of the material, and that a harder and more fragile material is subjected to a greater wear. Therefore, increasing the hardness of a material does not necessarily improve the wear-resistance of the material, but rather brings about the disadvantage that the workability of the material is reduced.

In the light of the fact that an oxide film displays the function of protecting a material against wear, the present inventors conducted a study for imparting wear-resistance property to a material by forming a very thin, compact oxide film on the surface of the material which undergoes friction, and finally arrived at the present invention. Namely, according to the present invention there is provided a magnetic material having excellent wear-resistance and high permeability, which is characterized by providing a Fe-Ni series permalloy containing 35 – 90 percent by weight of Ni, and not more than 10 percent by weight of at least one element selected from the group consisting of V and Ti, added thereto for the purpose of imparting wear-resistance to said alloy. It should be noted, however, that according to the present invention the wear-resistance is imparted to the alloy, not by increasing the hardness of said alloy but by the antifriction property of an oxide film peculiar to the material of the invention which is formed when the material is subjected to friction.

The Fe-Ni series permalloy referred to in the present specification which contains 35 – 90 percent by weight of Ni, includes not only a Fe-Ni binary alloy composed of 35 – 90 percent by weight of Ni and the remainder of Fe but also other alloys comprising more known alloying elements other than Ni. It is generally known that the Ni concentration of Fe-Ni alloys used as magnetic materials should lie within a range from 35 to 90 percent by weight and Fe-Ni alloy containing Ni at a concentration outside the range specified above, e.g. a concentration of 30 or 90 percent by weight, does not have magnetic properties suitable for use for practical applications.

It is also well known to add in a Fe-Ni series permalloy containing 35 – 90 percent by weight of Ni, other elements for the purpose of improving the magnetic property, i.e. permeability of the alloy, elements Mo, Cr, W and Co are known as such. These elements are incorporated at a concentration in the order of 4 percent by weight. For instance, an alloy incorporating Mo is known as Mo permalloy. Mn is also added at a concentration of not higher than 1 percent by weight, as desulfurizing agent for improving the workability of the alloy. In the present specification all of these alloys are generally referred to merely as a Fe-Ni alloy containing 35 – 90 percent by weight of Ni.

The concentrations of the alloying elements in the magnetic material of the invention are restricted to the ranges specified above for the following reasons. Namely, the Fe-Ni alloy which is the basic material of the subject magnetic alloy has high permeability when the Ni concentration is in the range of 35 – 90 percent by weight, and various types of Fe-Ni alloys falling in this range are being used for magnetic heads. V or Ti to be added to the basic Fe-Ni alloy has the same effect as that of the aforesaid additive elements Mo, Cr, W, etc. in the ordinary Fe-Ni alloys of multi element type. Therefore, the concentration of Ni other alloying, except for Mn which is usually added as desulfurizing agent (at a concentration of not higher than 1 percent by weight) to improve the workability of the material, need be adjusted depend upon the concentrations of V and Ti so as to achieve high permeability.

Namely, the permeability of a magnetic alloy is related with the anisotropic energy K and magnetostriction constant $\lambda$ of the alloy, and the value of $\lambda$ is mainly varied by the Ni concentration and the value of K by the concentrations of Ni and the other alloying elements, the cooling velocity after the annealing of the alloy, etc. Therefore, the composition of the magnetic material is desirably selected by taking these points into account.

Vanadium is an element highly effective for enhancing the electrical resistivity and improving the high frequency magnetic property of the alloy. However, when the concentration of V is not lower than 10 percent by weight, the saturated flux density of the alloy becomes too low even if it is added alone to the Fe-Ni binary alloy (for instance, when 10 percent by weight of V is added to a Ni-Fe alloy of high permeability containing 79 percent by weight of Ni, the saturated flux density Bs of the alloy is 1800 gauss). In addition, since V is an element having a strong oxidizing property, the rolling of the alloy becomes difficult, whereby rendering the alloy impractical. On the other hand, the addition of V facilitates the formation of antifriction oxide film and concurrently enables a high frequency magnetic property to be obtained. Therefore, the higher the V concentration is, the better it becomes, and a preferable range of the V concentration is not lower than 1 percent by weight.

Ti, similar to V, is an element having a strong oxidizing property, and the addition of a small amount (at a concentration not higher than 1 percent by weight) of this element as dioxidizing agent is effective for increasing the purity of the alloy. However, the hardness of the alloy increases with the increased concentration of Ti, and the rolling of the alloy becomes relatively difficult when the concentration exceeds 6 percent by weight and becomes extremely difficult due to precipitation hardening when the concentration exceeds 10 percent by weight. From the standpoints of workability of the alloy and formation of the oxide film, therefore, a particularly preferable Ti concentration range is from not lower than 0.2 to not higher than 6 percent by weight. Further, when the Ti concentration exceeds 10 percent by weight, the saturated flux density of the alloy becomes small (for instance, when 10 percent by weight of Ti is added to a Ni-Fe alloy of high permeability containing 80 percent by weight of Ni, the saturated flux density Bs of the alloy is 2300 gauss) and the practical value of the alloy is lowered, as in the case of V. The concentration of V or Ti should not exceed 10 percent by weight because otherwise the workability of the alloy will be degraded and, for the same reason, the total concentration of V and Ti should not exceed 10 percent by weight when both elements are concurrently present in the alloy. It is preferable that all of the alloys falling in the composition ranges specified above be melted in a non-oxidizing gas or vacuum.

The magnetic material according to the present invention has an oxide film formed thereon when it is brought into frictional engagement with a magnetic recording medium (a magnetic recording tape), and the oxide film imparts wear-resistance to the material. Even when the oxide film is worn out, a new oxide film is formed therebeneath and maintains the magnetic material resistive to wear. The oxide film is presumably formed by the heat generated by the frictional engagement between the magnetic material and the magnetic recording medium. However, the composition of the oxide film and the relationship between the film thickness and the concentration of V and/or Ti are not clearly understood.

Now, examples of the present invention will be illustrated hereunder: Table 1 shows the compositions of various alloys used in the examples of the present invention.

Table 1

| Alloy No. | Composition (% by weight) | | | | | |
|---|---|---|---|---|---|---|
| | Ni | Mo | Ti | V | Mn | Fe |
| 1 | 80 | 4 | 1 | — | 0.5 | Remainder |
| 2 | 81 | 4 | 2 | — | 0.5 | do. |
| 3 | 81 | 4 | 3 | — | 0.5 | do. |
| 4 | 81 | 4 | 4 | — | 0.5 | do. |
| 5 | 80 | 4 | 0.2 | — | 0.5 | do. |
| 6 | 80 | 4 | 0.5 | — | 0.5 | do. |
| 7 | 36 | — | 1 | — | 0.5 | do. |
| 8 | 45 | — | — | 3 | 0.5 | do. |
| 9 | 74.5 | — | — | 2.5 | 0.5 | do. |
| 10 | 76.5 | — | — | 3.5 | 0.5 | do. |
| 11 | 82 | — | — | 4.5 | 0.5 | do. |
| 12 | 82 | — | — | 5 | 0.5 | do. |
| 13 | 82 | — | — | 5.6 | 0.5 | do. |
| 14 | 83 | — | — | 6 | 0.5 | do. |
| 15 | 83 | — | — | 6.5 | 0.5 | do. |
| 16 | 83 | — | 1 | 6 | 0.5 | do. |

Although Mn is incorporated in all of the sample alloys shown in Table 1, it should be understood that it is not an essential constituent, but it is incorporated for the purpose of improving the workability of the alloys as stated previously and does not have any influence on the magnetic properties of the alloys.

EXAMPLE 1

Magnetic alloys Nos. 1 to 4 of the compositions shown in Table 1 were produced by adding 1 – 4 percent by weight of Ti to an ordinary basic permalloy (composed of 79 percent by weight of Ni, 4 percent by weight of Mo and the remainder of Fe). Each of the magnetic alloy was melted in vacuum in a high frequency induction melting furnace and the molten alloy was cast to form an alloy ingot. the sample alloy ingot was heated to 1200°C. and formed into a 7 mm thick flat sheet by hot forging and rolling. The flat alloy sheet was subjected to an intermediate annealing in hydrogen atmosphere at 800°C. for 3 hours and then subjected to a cold rolling to reduce the thickness thereof to 0.5 mm. The alloy sheet of reduced thickness was again subjected to an annealing in hydrogen atmosphere at 8-00°C. for 2 hours and the thickness thereof was further reduced to 0.05 mm by cold rolling. An wear test sample having a thickness of 1 mm was taken from the alloy sheet during the first cold rolling step and a ring-shaped sample (having an outer diameter of 45 mm and an inner diameter of 33 mm) for measuring the magnetic properties of the alloy was taken from the 0.05 mm thick alloy sheet by punching. The ringshaped sample was subjected to an annealing in dry hydrogen at 1000°C (the dew point was −30°C. or lower) for 2 hours and then cooled in the furnace. The cooling below 600°C. was effected at the rate of 500°C./hr for Alloy No. 1, 1000°C./hr for Alloy No. 2, and 1500°C./hr for Alloys Nos. 3 and 4. The magnetic and physical properties of the alloys thus treated are shown in Table 2 in comparison with those of the ordinary 4 percent Mo permalloy, the basic material of the magnetic alloys of the present invention, which was treated in the same manner as the alloys of the invention.

alloy No. 6 (consisting of 80 percent by weight of Ni, 4 percent by weight of Mo, 0.5 percent by weight of Ti and the remainder of Fe) shown in Table 1 were melted in the atmosphere while proptecting them against oxidation and each formed into a 1 mm thick alloy sheet Table 2

| Alloy No. | Effective permeability 1 KHZ | 10 KHZ | 100 KHZ | Saturated flux density (G) | Coercive force (Oe) | Electrical resistivity (μΩ -cm) | Vickers hardness |
|---|---|---|---|---|---|---|---|
| 1 | 31,000 | 13,600 | 2,100 | 7,800 | 0.031 | 62 | 145 |
| 2 | 31,400 | 14,200 | 2,200 | 6,900 | 0.030 | 65 | 160 |
| 3 | 29,800 | 13,600 | 2,300 | 6,100 | 0.026 | 68 | 190 |
| 4 | 14,000 | 10,600 | 2,500 | 5,300 | 0.040 | 72 | 240 |
| 4 % Mo perm-alloy | 25,500 | 12,700 | 2,000 | 8,400 | 0.031 | 55 | 130 |

As will be apparent from Table 2, the alloys of the invention incorporating Ti have higher permeabilities than that of the ordinary Mo permalloy, and the alloy of high Ti concentration (Alloy No. 4) has large electrical resistivity and hence less eddy-current loss and good permeability at high frequencies (e.g. at a frequency of 100 KHZ in Table 2).

The accompanying drawing is a graph showing the wear-resistance characteristic, i.e. the relationship between the length of the run of a tape and the amount of wear of various magnetic alloys measured by using an wear tester designed especially for measuring the amounts of wear of the alloys by frictional contact with a magnetic recording tape. The sample alloys submitted for this test were annealed at a temperature of 1100°C. The test was conducted under such conditions that the contact area of the sample was 1 mm × 10 mm, the contact pressure was 1 kg/cm$^2$, the tape speed was 3 m/s and the magnetic recording tape used was a $\gamma$-$Fe_2O_3$ computer tape. In the graph, the curves 1 and 2 represent the amounts of wear of the ordinary Mo permalloy which is the base of the magnetic alloys of the invention, and the curves 3, 4, 5 and 6 represent the amounts of wear of Alloys Nos. 1, 2, 3 and 4 shown in Table 1 respectively. As may be apparent from these curves, the amounts of wear of the magnetic materials according to the present invention (the curves 3 – 6) are as small as about one-half to one-fifth of those of the Mo permalloy (the curves 1 and 2), indicating that the wear-resistance of the inventive alloys is drastically improved by the addition of Ti. In the case of alloy No. 5 which is added with a relatively less amount of Ti, the amount of the oxide film formed is small, and accordingly, the amount of wear is 50 microns at a length of tape run of 97 km, but this amount of wear is still as small as about one-half of that of the Mo permalloy. The improved wear-resistance is the characteristic feature of the magnetic material of the present invention and is attributable to the antifriction property of the oxide film formed on the friction surface of the material. Thus, according to the present invention there can be obtained an excellent magnetic material having good permeability and markedly improved wear-resistance, which is highly applicable for use as magnetic heads.

EXAMPLE 2

Magnetic alloy No. 5 (consisting of 80 percent by weight of Ni, 4 percent by weight of Mo, 0.2 percent by weight of Ti and the remainder of Fe) and magnetic alloy No. 6 (consisting of 80 percent by weight of Ni, 4 percent by weight of Mo, 0.5 percent by weight of Ti and the remainder of Fe) shown in Table 1 were melted in the atmosphere while proptecting them against oxidation and each formed into a 1 mm thick alloy sheet in the same manner as described in Example 1. A wear test sample was prepared from each alloy sheet. The sample was annealed in hydrogen at a temperature of 1100°C. and then subjected to wear test. The method and conditions employed in the wear test were exactly the same as in Example 1. As a result, the amount of wear of alloy No. 5 was 49 microns and that of alloy No. 6 was 13 microns at a length of tape run of 97 km. These values are as small as one-half to one-seventh of that (100 microns) of the ordinary Mo permalloy.

EXAMPLE 3

Magnetic alloy No. 7 (consisting of 36 percent by weight of Ni, 1 percent by weight of Ti and the remainder of Fe) shown in Table 1 was produced by adding Ti or V in a binary Fe-Ni alloy containing 35 – 50 percent by weight of Ni (represented by the name of 45 permalloy), and worked in exactly the same manner as in Example 1 to give a 0.2 mm thick thin alloy sheet. A ring-shaped sample (having an outer diameter of 45 mm and an inner diameter of 33 mm) for use in the measurement of the magnetic properties of the alloy and an elongate strip-shaped sample for use in the measurement of electrical resistivity of the alloy were prepared from the thin alloy sheet. These samples were annealed in dry hydrogen (the dew point was −30°C. or below) at a temperature of 1100°C. for 2 hours and then allowed to cool to normal temperature in the furnace (the mean cooling rate below 600°C. was 120°C./hr). The measured properties of the alloy thus obtained are shown below:

| | | |
|---|---|---|
| Alloy No. 7 | | |
| Initial permeability $\mu i$ | : | 3500 |
| Saturated flux density Bs | : | 11500 gauss |
| Coercive force Hc | : | 0.18 oersted |
| Electrical resistivity $\rho$ | : | 80 μΩ -cm |
| Alloy No. 8 | | |
| Initial permeability $\mu i$ | : | 4000 |
| Saturated flux density Bs | : | 12000 gauss |
| Coercive force Hc | : | 0.08 oersted |
| Electrical resistivity | : | 76 μΩ -cm |

Further, a wear test of the alloys in the Example was conducted on each 1 mm thick sample taken from each alloy and annulealed in hydrogen at a temperature of 1100°C. The testing method and conditions were exactly the same as in Example 1. As a result, the amount of wear of alloy No. 7 was 35 microns and that of alloy No. 8 was 11 microns, at a length of tape run of 97 km. These values are about one-fifth of that (160 microns)

of the ordinary binary permalloy or smaller, and clearly show that the wear-resistance of the alloys was improved by the addition of Ti or V. The improved wear-resistance resulting from addition of V, similar to that resulting from addition of Ti, is a characteristic feature of the magnetic material of the invention, and is attributable to the antifriction effect of the oxide film formed on the friction surface of the material.

EXAMPLE 4

Magnetic alloys Nos. 9 – 16 shown in Table 1 were produced by adding 2.5 – 6.5 percent by weight of V (and further 1 percent by weight of Ti in the case of alloy No. 16) in basic binary Fe-Ni alloys containing 75 – 85 percent by weight of Ni (represented by the name of 78 percent permalloy), and worked in the same manner as in Example 1 to give a 0.05 mm thick and a 0.025 mm thick thin alloy sheets, respectively. A ring-shaped sample (having an outer diameter of 45 mm and an inner diameter of 33 mm) was punched out of each thin alloy sheet for use in the measurement of the magnetic properties of the respective alloy. Then, the sample was annealed in dry hydrogen (the dew point was –30°C. or below) at a temperature of 1100°C. for 1 hour and cooled to normal temperature. Usually, the cooling below the temperature of 600°C. is effected at a constant cooling rate or by maintaining the alloy at a predetermined temperature for a suitable period of time, so as to obtain a desirable permeability. In this Example also, the cooling was effected by a method most suitable for each alloy. The magnetic and physical properties measured of the 0.05 mm thick sample sheets of the respective alloys (alloys Nos. 9 – 16) thus treated are shown in Table 3, and the effective permeabilities measured of the 0.05 mm thick sample sheet of the alloys (alloys Nos. 9 – 14) and 0.025 mm thick sample sheets of the respective alloys (alloys Nos. 11 – 15) treated in the same manner are shown in Table 4. Further, the wear test results of the alloys in this Example (alloys Nos. 9 – 16) are shown in Table 3 and in the drawing by the curve 7. The test was conducted by the same method and under the same conditions as in Examples 1 and 2. The amounts of wear shown in Table 3 are the values measured at a length of tape run of 97 km.

Table 3

| Alloy No. | Low temperature heat treating method | Initial permeability (G/Oe) | Saturated flux density (G) | Coercive force (Oe) | Electrical resistivity (μΩ-cm) | Vickers hardness | Amount of wear (μm) |
|---|---|---|---|---|---|---|---|
| 9 | Cooled at the rate of 400°C./hr | 15,000 | 10,200 | 0.040 | 53 | 134 | 10 |
| 10 | Cooled at the rate of 50°C./hr | 20,000 | 8,900 | 0.030 | 63 | 127 | 10 |
| 11 | Cooled at the rate of 100°C./hr | 55,000 | 7,500 | 0.016 | 67 | 135 | 10 |
| 12 | Cooled at the rate of 50°C./hr | 40,000 | 6,600 | 0.015 | 70 | 136 | 9 |
| 13 | Cooled at the rate of 20°C./hr | 30,000 | 6,000 | 0.019 | 74 | 126 | 9 |
| 14 | Cooled at the rate of 10°C./hr | 85,000 | 5,300 | 0.007 | 77 | 129 | 10 |
| 15 | Maintained at 440°C. for 50 hr. | 60,000 | 4,800 | 0.013 | 80 | 130 | 11 |
| 16 | Cooled at the rate of 30°C./hr | 61,000 | 4,200 | 0.009 | 80 | 140 | 9 |

Table 4

| Thickness (mm) | Alloy No. | Effective permeability 1 KHZ | 3 KHZ | 10 KHZ | 30 KHZ | 100 KHZ |
|---|---|---|---|---|---|---|
| 0.05 | 9 | 10,000 | 9,300 | 6,900 | 4,600 | 2,000 |
| | 10 | 15,000 | 13,800 | 9,100 | 4,900 | 2,100 |
| | 11 | 50,300 | 34,000 | 14,300 | 5,300 | 2,200 |
| | 12 | 37,000 | 30,200 | 16,100 | 6,200 | 2,500 |
| | 13 | 29,200 | 25,800 | 16,400 | 6,500 | 2,500 |
| | 14 | 67,800 | 42,300 | 19,300 | 8,100 | 3,100 |
| 0.025 | 11 | 59,800 | 49,400 | 29,900 | 14,100 | 5,400 |
| | 12 | 61,400 | 51,400 | 32,600 | 13,900 | 4,800 |
| | 13 | 38,800 | 36,600 | 27,500 | 13,000 | 5,000 |
| | 14 | 78,200 | 59,600 | 35,900 | 16,800 | 6,200 |
| | 15 | 63,300 | 46,000 | 29,500 | 16,900 | 7,000 |

It will be clearly understood from Table 3 and the curve 7 in the drawing that the magnetic alloys of the invention comprising V have excellent magnetic properties and particularly those of high V concentration (e.g. alloys Nos. 14 and 15) have magnetic properties far superior to those of the conventional permalloys of high permeability at high frequencies. It will also be understood that the magnetic alloys of the invention have good wear-resistance despite of their low hardnesses and the amounts of wear thereof are smaller than one-tenth of those of the conventional permalloys. This is attributable to the anitfriction effect of the oxide film formed by the frictional contact, similar to the case of adding Ti in the alloys.

Thus it can be said that the alloys of the present invention comprising V are ideal magnetic materials for magnetic heads excellent in both wear-resistance and permeability. It is generally considered that the properties of the magnetic materials can be more improved when V is added than when Ti is added in said magnetic materials.

As may be understood from the Examples given herein, the magnetic alloys according to the present invention not only have very high permeability and good workability but also have excellent wear-resistance, and are highly suitable for use in the production of highly efficient and durable magnetic heads.

In addition, since the high wear-resistance of the alloys of the invention is not obtained by means of increasing the hardness thereof, the alloys can be worked with no difficulty and are adapted for mass production of magnetic heads and hence extremely advantageous economically.

We claim:

1. An abrasive resistant magnetic material of high permeability for magnetic heads consisting by weight of 35 to 90 % Ni, 0.2 to 6 percent by weight Ti, 1 to 10 percent by weight V, up to 1 percent by weight Mn, and the balance Fe, the combined weights of V and Ti being not more than 10 percent.

2. The magnetic material of claim 1, wherein the amount of Mn therein is sufficient to improve the workability of the material.

3. The magnetic material of claim 1, wherein the amount of Mn is about 0.5 percent by weight.

4. The magnitude material of claim 1, consisting by weight of 35 to 90 % Ni, 0.2 to 6 percent by weight Ti, 1 to 10 percent by weight V, and the balance Fe.

* * * * *